(12) United States Patent
Ruid et al.

(10) Patent No.: US 7,476,427 B2
(45) Date of Patent: Jan. 13, 2009

(54) FACED FIBERGLASS BOARD WITH IMPROVED SURFACE TOUGHNESS

(75) Inventors: John O. Ruid, Schwenksville, PA (US); Ronald Moulder, Lakeland, FL (US)

(73) Assignee: Certainteed Corporation, Valley Forge, PA (US)

( * ) Notice: Subject to any disclaimer, the term of this patent is extended or adjusted under 35 U.S.C. 154(b) by 819 days.

(21) Appl. No.: 10/798,184

(22) Filed: Mar. 11, 2004

(65) Prior Publication Data

US 2005/0229518 A1    Oct. 20, 2005

(51) Int. Cl.
*B32B 1/08* (2006.01)
*B29D 22/00* (2006.01)
*B29D 23/00* (2006.01)

(52) U.S. Cl. .......................... 428/35.7; 428/74; 428/75; 428/220; 138/149; 138/146; 138/153

(58) Field of Classification Search ................... 428/74, 428/75, 35.7, 220; 138/146, 149, 153
See application file for complete search history.

(56) References Cited

U.S. PATENT DOCUMENTS

| | | | |
|---|---|---|---|
| 1,238,356 A | 8/1917 | Stokes | |
| 3,025,197 A | 3/1962 | Sheidley | |
| 3,092,529 A | 6/1963 | Pearson | |
| 3,212,142 A | 10/1965 | Ullman et al. | |
| 3,420,142 A | 1/1969 | Gale et al. | |
| 3,557,840 A | 1/1971 | Maybee | |
| 3,768,523 A | 10/1973 | Schroeder | |
| 3,812,002 A | 5/1974 | Lurie | |
| 3,910,145 A | 10/1975 | Bender et al. | |
| 3,955,031 A * | 5/1976 | Jones et al. | 442/412 |
| 3,958,385 A | 5/1976 | Bondra et al. | |
| 3,964,232 A | 6/1976 | Bender et al. | |
| 3,979,537 A | 9/1976 | Troyer | |
| 4,039,709 A * | 8/1977 | Newman | 428/159 |
| 4,183,379 A | 1/1980 | Marquette et al. | |
| 4,196,755 A | 4/1980 | Kutnyak et al. | |
| 4,342,610 A | 8/1982 | Ray, Jr. | |
| 4,397,898 A | 8/1983 | Ray, Jr. | |
| 4,673,614 A * | 6/1987 | Wells et al. | 442/85 |

(Continued)

FOREIGN PATENT DOCUMENTS

DE    78 30 852    1/1979

(Continued)

OTHER PUBLICATIONS

CertainTeed Corporation, "Specification Sheet ToughGard™ Duct Liner with Enhanced Surface", 2001.

(Continued)

*Primary Examiner*—David R Dunn
*Assistant Examiner*—Chi Q Nguyen
(74) *Attorney, Agent, or Firm*—Duane Morris LLP

(57) ABSTRACT

An insulation product is provided comprising a sheet of randomly oriented fibers bonded by a binder. The sheet has first and second major surfaces and a pair of side portions. A facing layer is bonded to at least one of the major surfaces. A region of the sheet proximate to the facing layer is more puncture resistant than a remainder of the sheet.

22 Claims, 4 Drawing Sheets

U.S. PATENT DOCUMENTS

| | | | | |
|---|---|---|---|---|
| 4,726,985 | A | 2/1988 | Fay et al. | |
| 4,756,945 | A | 7/1988 | Gibb | |
| 4,764,420 | A * | 8/1988 | Gluck et al. | 428/317.7 |
| 4,835,045 | A | 5/1989 | Kielmeyer et al. | |
| 4,847,140 | A | 7/1989 | Jaskowski | |
| 4,866,905 | A | 9/1989 | Bihy et al. | |
| 4,909,282 | A | 3/1990 | Staugaard | |
| 4,917,929 | A | 4/1990 | Heinecke et al. | |
| 4,972,644 | A | 11/1990 | Rumiesz, Jr. et al. | |
| 4,990,370 | A | 2/1991 | Terry et al. | |
| 5,025,052 | A | 6/1991 | Crater et al. | |
| 5,246,760 | A | 9/1993 | Krickl | |
| 5,302,332 | A | 4/1994 | Simola et al. | |
| 5,331,787 | A | 7/1994 | Paulitschke et al. | |
| 5,350,063 | A | 9/1994 | Berdan et al. | |
| 5,379,806 | A | 1/1995 | Matthews et al. | |
| 5,421,938 | A | 6/1995 | Cunningham, Jr. | |
| 5,545,279 | A | 8/1996 | Hall et al. | |
| 5,545,453 | A | 8/1996 | Grant et al. | |
| 5,567,504 | A | 10/1996 | Schakel et al. | |
| 5,612,405 | A | 3/1997 | Bainbridge et al. | |
| 5,624,471 | A | 4/1997 | Gaeta et al. | |
| 5,625,999 | A | 5/1997 | Buzza et al. | |
| 5,642,601 | A | 7/1997 | Thompson, Jr. et al. | |
| 5,685,938 | A | 11/1997 | Knapp et al. | |
| 5,735,092 | A * | 4/1998 | Clayton et al. | 52/309.9 |
| 5,765,318 | A | 6/1998 | Michelsen | |
| 5,783,268 | A | 7/1998 | Noonan et al. | |
| 5,817,387 | A | 10/1998 | Allwein et al. | |
| 5,848,509 | A | 12/1998 | Knapp et al. | |
| 5,953,818 | A | 9/1999 | Matthews et al. | |
| 6,000,437 | A | 12/1999 | Ponder | |
| 6,044,604 | A * | 4/2000 | Clayton et al. | 52/309.9 |
| 6,083,594 | A | 7/2000 | Weinstein et al. | |
| 6,083,603 | A | 7/2000 | Patel et al. | |
| 6,093,481 | A * | 7/2000 | Lynn et al. | 428/217 |
| 6,141,930 | A | 11/2000 | Allwein et al. | |
| 6,165,305 | A | 12/2000 | Weinstein et al. | |
| 6,207,245 | B1 | 3/2001 | Miller et al. | |
| 6,231,927 | B1 | 5/2001 | Ruid | |
| 6,357,504 | B1 | 3/2002 | Patel et al. | |
| 6,383,594 | B2 | 5/2002 | Weinstein et al. | |
| 6,399,186 | B2 * | 6/2002 | Matthews et al. | 428/306.6 |
| 6,415,573 | B1 | 7/2002 | Moulder | |
| 6,422,848 | B1 | 7/2002 | Allen et al. | |
| 6,451,432 | B1 | 9/2002 | Azzopardi et al. | |
| 6,468,615 | B2 | 10/2002 | Weinstein et al. | |
| 6,484,463 | B1 | 11/2002 | Fay et al. | |
| 6,551,677 | B2 | 4/2003 | Weinstein et al. | |
| 6,551,951 | B1 | 4/2003 | Fay et al. | |
| 6,670,011 | B2 | 12/2003 | Weinstein et al. | |
| 6,769,455 | B2 * | 8/2004 | Toas et al. | 138/149 |
| 6,972,145 | B1 * | 12/2005 | Ruid et al. | 428/71 |
| 7,220,470 | B2 * | 5/2007 | Toas et al. | 428/35.7 |
| 2001/0030018 | A1 | 10/2001 | Weinstein et al. | |
| 2001/0033926 | A1 | 10/2001 | Matthews et al. | |
| 2002/0015814 | A1 | 2/2002 | Weinstein et al. | |
| 2002/0040556 | A1 | 4/2002 | Weinstein et al. | |
| 2002/0136854 | A1 | 9/2002 | Smith et al. | |
| 2002/0146521 | A1 | 10/2002 | Toas et al. | |
| 2003/0008092 | A1 | 1/2003 | Toas et al. | |
| 2003/0068943 | A1 | 4/2003 | Fay | |
| 2003/0082369 | A1 | 5/2003 | Arndt et al. | |
| 2003/0082387 | A1 | 5/2003 | Arndt et al. | |
| 2003/0144639 | A1 | 7/2003 | Gehling et al. | |
| 2003/0175466 | A1 | 9/2003 | Bogrett et al. | |
| 2003/0236043 | A1 | 12/2003 | Calzavara et al. | |
| 2004/0118472 | A1 | 6/2004 | Mota et al. | |
| 2004/0137181 | A1 | 7/2004 | Ruid et al. | |
| 2005/0031819 | A1 | 2/2005 | Mankell et al. | |

FOREIGN PATENT DOCUMENTS

| | | |
|---|---|---|
| DE | 79 20 480 | 11/1979 |
| DE | 3229601 A1 | 3/1984 |
| DE | 4108110 A1 | 12/1991 |
| DE | 93 02 056.2 | 8/1993 |
| DE | 197 00 373 A1 | 2/1998 |
| DE | 3118597 A1 | 2/1998 |
| DE | 4435317 A1 | 4/1998 |
| EP | 101376 B1 | 2/1984 |
| GB | 1358345 | 7/1974 |
| WO | WO 94/29540 A1 | 12/1994 |
| WO | WO 98/42930 | 10/1998 |
| WO | WO 01-63063 A1 | 8/2001 |

OTHER PUBLICATIONS

CertainTeed Corporation, "Certa*Faced Ultra*Duct Marketing Plan", Nov. 22, 1993.

CertainTeed Corporation, "List Prices—*ToughGard* Duct Board", Oct. 1, 1994, Valley Forge, Pennsylvania, USA.

CertainTeed Corporation, "Product Information—ToughGard Duct Board Fiber Glass Duct Board Systems", 1994, Valley Forge, Pennsylvania, USA.

CertainTeed Corporation, "Product Specification: PS 57.00", May 23, 1994.

CertainTeed Corporation, "Raw Material Specification: Certa*Faced Ultra*Duct Mat Facing", Jun. 23, 1994.

CertainTeed Corporation, "Specification Sheet—*ToughGard* Duct Board with Enhanced Surface", Jan. 2002.

CertainTeed Corporation, "Specification Sheet—*ToughGard* Duct Board with Enhanced Surface", May 2001.

CertainTeed Corporation, "Specification Sheet—Ultra*Duct Gold", Mar. 2002.

CertainTeed Corporation, CertainTeed Building Solutions, "Product Information," CertainTeed Duct Insulation.

CertainTeed Spec. Sheet, ToughGard™ Duct Board, 2 pages, Apr. 2001.

CETIAT "Test Report" Jul. 24, 1991, 3 pages (translation attached).

Climaver 234 (1982).

Climaver 254 (1984).

Climaver 264 (1982).

Climaver 284-234 "Construction and self-support air conditioning ducts", 4 pages (translation attached) (1988).

Climaver Plata, Specification of a Product, Relevance on first page, density 70 kg/m$^3$ (not translated) (1992).

Elasti-Glass® R3100B Series Glass Fiber Mats, Schuller, 2 pages (May 1997).

France -Air, "Glass Fibre panels for air ducts" (translation attached), 21 pages (1992).

French Republic, National Testing Laboratory, Nov. 28, 1998. 1 page (translation attached).

Glasuld Ventilations-Kanaler (translation of parts of the Danish Duct Application brochure attached).

Glasuld, Superfos Glasuld, Glasuld Perfofilt, "Superfos Glass Wool," product literature, Jan. 1975 (translation from Danish attached).

Isover "Gama Climaver".

Isover Gullfiber—translation of the relevant parts of the Swedish Product Catalogue for Technical Insulation Mar. 1989.

Isover Saint-Gobain Roche & Verre-Insulation and Air Conditioning, Mar. 1990, 3 pages (translation attached).

Johns Manville, Glass Fiber Mats, Elasti-Glass® 3200B Series, 1 p., Oct. 30, 2002.

Johns-Manville Fiber Glass, "Micro-Aire Duct Systems Fabrication Manual", USA (Jun. 1970)

Johns-Manville Manufacturing, "Finished Product Specification—Mat Faced Mad Board Spec. No. 4365-15.6", 1971-1973, USA.

Johns-Manville Manufacturing, "Manufacturing Specification—Micro-Aire Duct Board Standard Duty Heavy Duty Spec No. 4365-20", 1971-1973, USA.

Johns-Manville, "Air Handling Systems—Linacoustic RC™ Fiber Glass Duct Liner with Reinforced Coating System," (preliminary product information), AHS-329 Feb. 2002.

Johns-Manville, Air Handling Systems—SuperDuct™ Coated High Performance Air Duct Board, Type 475 & 800, AHS 200 Jun. 2000.

Knauf Air Duct Board, Form No. AH-SS-2 Effective: Jan. 1998, 2 pages.

Knauf Fiber Glass GmbH, "Submittal Sheet—Air Duct Board-M with Hydroshield Technology", Oct. 2000, USA.

Knauf Fiber Glass Insulation—Products 7 pages, Feb. 2002.

North American Insulation Manufacturers Association, "Fibrous Glass Commercial Insulation Boards", Insulation Facts #67, www.naima.org, Jan. 2003.

North American Insulation Manufacturers Association, "Fibrous Glass Duct Wrap", Insulation Facts #66, www.naima.org, Jan. 2003.

North American Insulation Manufacturers Association, "Fibrous Glass Duct Construction Standards", 2nd Edition, 1993.

Saint-Gobain Insulation, Facing of "Comfort Products," (mainly extracted from purchasers' working group with Nathalie Rose (CRIR) in 2001), T Gasser- CRIR, Oct. 25, 2002, 11 pages.

Saint-Gobain Isover OY, Isover Comfort KL-C, product information, http://www.isover.fi/en/products/default.asp?aid=1&bid=4&cid=282&val=1, 3 pages.

Testing Data from the Competitive Audit on Mar. 25, 1999, 3 pages.

Underwriters Laboratories Inc., "Investigation of 'Climaver 284' Air Duct Board", Dec. 19, 1991, Northbrook, Illinois, USA.

Underwriters Laboratories Inc., "Report on Air Ducts", Jun. 8, 1992, Northbrook, Illinois, USA.

Certainteed CrimpWrap Crimped Pipe and Tank Wrap Specification Sheet, Dec. 2002, 2 pages.

Flex-Clad 400™, Data Sheet, MFM Building Products Corp., Coshocton, OH, 1 page.

Flex-Clad 400™, www.flexclad.com, web site home page, MFM Building Products Corp., Coshocton, OH, accessed Jul. 24, 2004, 2 pages.

VentureClad™ 1577CW®, Venture Tape Corp., Rockland, MA, product literature, 1 page.

LAMTEC Product Specifications for R-3070 Foil/Scrim/Kraft, www.lamtec.com/PS-R3070.htm, last updated May 11, 2004, Lamtec Corporation, 3 pages.

Miller, B., "Critical Evaluation of Upward Wicking Tests", International Nonwovens Journal, www/india/subscrip/inj00_1/p35.html, pp. 1-3, Mar. 12, 2002.

Kim, H.S. et al., "Characterizing Fuzz in Nonwoven Fabrics", International Nonwovens Journal, www/inda/subscrip/inj00_1/p18.html, pp. 1-8, Mar. 11, 2002.

Dent, R.W., "An Analysis of Fabric 'Hand' and 'Feel'", International Nonwovens Journal, www/inda/subscrip/inj00_1/p11.html, pp. 1-11, Mar. 12, 2002.

Oathout, J.M., "Determining the dynamic efficiency with which wiping materials remove liquids from surfaces", International Nonwovens Journal, www/inda/subscrip/inj00_1/p30.html, pp. 1-9, Mar. 11, 2002.

Barker, R.L., "Evaluating operating room gowns: comparing comfort of nonwoven and woven materials", International Nonwovens Journal, www/inda/subscrip/inj00_1/p230.html, pp. 1-10, Mar. 12, 2002.

International Nonwovens Journal, vol. 9, No. 1, 40 pages, Spring 2000, www.inda.org/subscrip/.

Huang and Gao, "Spunbond Technology", http://216.239.39.104/search?q=cache:0eatiNLJVeEJ:www.apparelsearch.com/education_r, pp. 1-13, Jul. 29, 2003.

Garland Insulation, New Home Construction, http://216.239.57.104/search?q=cache:qnVm9UlfP7cJ:www.garlandinsulating.com/newho, pp. 1-5, Aug. 1, 2003.

Mercantile Development, Inc. Web Bonding Techniques, http://www.diwipers.com/Technolocy/webbondingtechniques.htm, pp. 1-5, Jul. 29, 2003.

Trends, Index '99, "Nordson debuts new look, new products at Index '99", pp. 1-4, vol. 11, No. 1, Apr. 1999.

Series MB-200 Meltblown Applicator, Nordson, trade literature pp. 1-2, 2000.

Nordson, Operator's Card, Meltblown (MB200) Applicators, pp. 1-6, undated.

Nordson Melt Blown Fiberization for Insulation Batt Coating, report, 2 pages, undated.

Nordson, Center of Excellence Nonwovens Pilot Line, COE II Specifications, 4 pages, 2002.

Nordson, Non-Contact Wide-Web Laminating, 2 pages, 1999.

Nordson, EP 26 SD / EP 34 S/ EP 34 SD Hot Melt Spray Guns, 2 pages, 2002.

Nordson, Series CF-200 Controlled Fiberization™ Guns, 2 pages, 1996.

Nordson, Controlled Fiberization™ Spray Nozzles, 2 pages, 1995.

Nordson, Series 3800V and 3900V Applicators with Vista™ Controls, 2 pages, 1998.

Nordson, PA-2520 Adhesive Applicator for Product Assembly, 2 pages, 1998.

Nordson, PA-2510 Adhesive Application System, 2 pages, 1998.

Nordson, Series 3000V Applicators with Vista™ Controls, 2 pages, 1996.

Nordson, Series CC-200 Modular Control Coat® Applicator, 2 pages, 1998.

Nordson, Series MB-200 Meltblown Applicator, 2 pages, 2000.

Nordson Corporation Nonwovens Systems, Atlanta Equipment and Web Handling Capability, 1 page, 2003.

Nordson Corporation Nonwovens Systems, The Control Coat® System, http://www.nordson.com/nonwovens/ctrlcoat.htm, pp. 1-3, accessed Feb. 16, 2003.

Nordson Corporation Nonwovens Systems, Nozzles, http://www.nordson.com/nonwovens/nozzles.htm, pp. 1-2, accessed Feb. 16, 2003.

Nordson, MX 3400 and 4400 Series Adhesive Application System brochure, 4 pages, 2001.

Rockwool Silk, Rockwool A/S, 2 pages, Oct. 31, 2003.

Gullfiber Insulation with Gillfiber, Do-it-yourself, Dec. 1983.

Superfos Glass Wool. Glasuld Perfofilt, Jan. 1975 (Product Literature).

Gullfiber M-Skiva, Mar. 1984 (Product Literature).

Johns Manville, Easyfit, 2002 (Product Literature).

Johns Manville, Formaldehyde-free, 2002 (Product Literature).

* cited by examiner

FACED FIBERGLASS BOARD WITH IMPROVED SURFACE TOUGHNESS

FIELD OF INVENTION

The present invention relates to fiber insulation products, and more particularly, to fiber insulation board products and methods of manufacturing the same.

BACKGROUND OF THE INVENTION

Fiberglass board products are used to impart both thermal and acoustical insulation to surfaces and enclosures. The bottom surface of these products is often laminated to or faced with a facing material, such as plastic, foil, paper or laminates, such as FSK (foil-scrim-kraft paper) or PSK (plastic-scrim-kraft paper).

In some circumstances, it may be desirable to have the surfaces (faced or unfaced) of the fiberglass board be more rigid and/or have improved surface toughness. For example, improving the surface toughness and rigidity of the fiberglass surface proximate to the facing layer is desired when the facing layer is exposed after installation in, for example, agricultural buildings such as open barns where the installed fiberglass board is exposed to pecking or other damage by birds and other animals. It is also preferred that the surface toughness and rigidity of the product be improved without enhancements to the facing layer or layers and without increasing fiber density, each of which can add significant expense and/or undesired weight to the product. Fiberglass board products that address these concerns are not currently known.

Accordingly, there remains a need for a fiberglass board product that provides improved surface rigidity and/or toughness proximate to a facing layer but that can be made without adding significant additional expense and/or weight to the product.

SUMMARY OF THE INVENTION

The present invention provides an insulation product comprising a sheet of randomly oriented fibers bonded by a binder. The sheet has first and second major surfaces and a pair of side portions. A facing layer is bonded to at least one of the major surfaces. A region of the sheet proximate to the facing layer is more puncture resistant than a remainder of the sheet. The insulation product provides improved surface rigidity, surface toughness, puncture resistance, penetration resistance and/or impact resistance proximate to a facing layer without significant additional expense and/or without significant additional weight.

A method of manufacturing an insulation product is also provided. A web of randomly oriented fibers generally having a first major surface and a second major surface and a pair of side portions is formed on a forming belt. The fibers are coated with a heat curable binder. The web has a higher percentage by weight of the heat curable binder in a region of the web proximate to at least one of the major surfaces compared with a total percentage by weight of the binder in the web. The web is compressed and heated to form a sheet of the randomly oriented fibers bonded by the heat curable binder. The sheet has first and second major surfaces and a pair of side portions. A facing layer is affixed to the at least one of the major surfaces of the sheet, wherein a region of the sheet proximate to the facing layer is more puncture resistant than a remainder of the sheet.

In another embodiment, an insulation product is provided comprising a rigid or semi-rigid fiber glass board having first and second major surfaces and a pair of side portions. The board comprises randomly oriented glass fibers bonded by a heat cured binder. The board has a fiber density greater than about 2.0 pounds per cubic foot. A facing layer is bonded to at least one of the major surfaces. The board has a higher percentage by weight of the heat cured binder in a region of the board proximate to the facing layer compared with a total percentage by weight of the heat cured binder in the sheet, thereby improving a puncture resistance of the region.

In yet another embodiment, a fiberglass board insulation product comprises a rigid or semi-rigid fiber glass board comprising randomly oriented glass fibers bonded by a heat cured binder. The board has first and second major surfaces and a pair of side portions. The board has a higher percentage by weight of the heat cured binder in a region of the board proximate to at least one of the major surfaces compared with a total percentage by weight of the heat cured binder in the board, thereby improving a durability of the region.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION OF THE INVENTION

Provided herein are methods for manufacturing board insulation products and the board insulation products made thereby. Insulation materials generally span the range from light weight, flexible and resiliently compressible foams and nonwoven fiber webs to rigid or semi-rigid boards. Generally, these insulating materials have densities in the range of about 0.5-7 lb/ft$^3$ (8-112 kg/m$^3$). Foam and nonwoven fiber web materials are usually provided in continuous sheeting that is sometimes cut to preselected lengths, thus forming batts. These articles are usually characterized as "low density," having a density in the range of about 0.5-6 lb/ft$^3$ (8-96 kg/m$^3$), and preferably about 1-4 lb/ft$^3$ (16-64 kg/m$^3$), and more preferably 0.3 to 1.5 lb/ft$^3$ (4.8-24 kg/m$^3$). The thickness of the insulation blanket or mat is generally proportional to the insulated effectiveness or "R-value" of the insulation. These low density insulation mats typically have a thickness between about 3.5-10 inches.

In contrast, rigid to semi-rigid insulation boards ("high density" insulation) tend to have densities in the higher portion of the range, at about 2-7 lb/ft$^3$ (32-112 kg/m$^3$), and preferably at about 4-7 lb/ft$^3$ (64-112 kg/m$^3$). These boards customarily are produced as sheets typically having a thickness in the range of about 0.25-2 inches, and more preferably about 0.5-2 inches, and about 2-4 feet wide by about 4-12 feet in length. The board insulation products of this invention are well suited to agricultural buildings where fowl fly into or peck at the wall surfaces. They may are also suitable as sheathing, building insulation, duct liner and automotive insulation.

Figure 1:
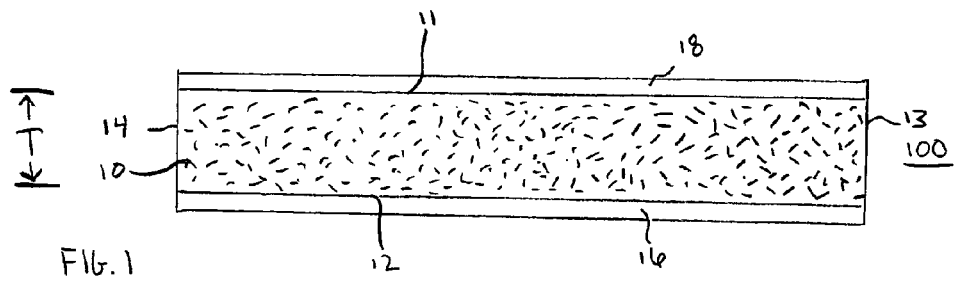
FIG. 1 is a side elevational view of an exemplary insulation product according to the present invention.

With reference to the Figures, and more particularly to FIG. 1 thereof, insulation product 100 is illustrated. Insulation product 100 preferably includes a high density board insulation sheet 10 (as described above) formed from organic fibers such as polymeric fibers or inorganic fibers such as rotary glass fibers, textile glass fibers, stonewool (also known as rockwool) or a combination thereof. Mineral fibers, such as glass, are preferred. Sheet 10 has a first and second major surfaces 11, 12, respectively, and first and second side portions 13 and 14, respectively. In some embodiments, a facing layer 16, which may be a polymeric, foil (e.g., aluminum), paper, or FSK or PSK laminate layer, is attached to the second major surface 12 of the sheet 10. This material tends to improve the strength of the duct board material, as well as improve abrasion resistance, toughness, cleanability and appearance of the board. The facing layer 16 may be affixed to the surface 12 by an adhesive, such as a hot-melt or water-based adhesive, and may or may not be a vapor retardant to reduce water vapor permeability. The facing layer 16 can be vapor impermeable or permeable, depending on its makeup, degree of perforation, and intended use. The product 100 may optionally include a second facing layer 18 affixed to the first major surface 11.

In an exemplary embodiment, the sheet 10 is formed from glass fibers bound together with a heat cured binder, such as a resinous phenolic material like phenolformaldehyde resins or phenol urea formaldehyde (PUFA). Melamine formaldehyde, acrylic, polyester, urethane and furan binder may also be utilized in some embodiments. Conventional insulation board sheets typically have about 15% or less of their dry weight attributable to the heat cured binder.

In an exemplary embodiment of sheet 10, the region of sheet 10 proximate to at least one major surface, such as second major surface 12 and facing layer 16, preferably the region within about ⅓ of the thickness "T" of the sheet 10, and more preferably the region within about ¼ of the thickness T of the sheet 10, has a higher dry weight percentage of heat cured binder than the sheet 10 as a whole. It is believed that locally increasing binder content proximate to the second major surface 12 and facing layer 16 increases the overall durability and wear resistance of the product, such as by improving the product's resistance to tearing by improving, for example, the rigidity, surface toughness, tensile strength, puncture resistance, penetration resistance and/or impact resistance (hereinafter, referred to as "durability") of that region after the binder cures, and particularly increases the durability of second major surface 12, to which facing layer 16 is bonded. Cured binder, however, can become very brittle. Therefore, too much binder agent can have an adverse effect on the durability of the region, making the second major surface 12 brittle. In one embodiment, the dry weight percentage of binder in the sheet 10 is increased between about 1-10% (such that the total percentage is between about 16-25%, but possibly higher) in order to provide the increased binder in the region proximate to the surface 12. As noted, the excess binder (compared to conventional board insulation products) is concentrated in the region proximate to a major surface, i.e., in the region in which it is desired to increase durability. In one embodiment, the insulation product including the localized increased binder content provides for improved puncture resistance in the insulation board as measured by the Beach puncture test, referred in TAPPI and ASTM as test method T 803, which is designed to measure resistance to a pyramidal point penetrating through a sheet material such as corrugated board or FSK. UL test 181 (Standard for Factory-Made Air Ducts and Connections), UL section 13, 9$^{th}$ Edition (Sep. 19, 2002). which notes resistance to a circular face penetrating through a section of duct board, may also be used. In one embodiment, the puncture resistance of the insulation product is improved at least 10% over the standard board product.

In an exemplary embodiment, a non-brittle toughening agent is applied along with the binder agent to the fibers in the sheet 10 in order to maintain the amount of the binder within the region at a level that keeps the region from becoming too brittle. In one embodiment, the toughness improvement additive is a "crack stop" material such as latex, often added to materials such as impact-hardened polystyrene to reduce brittleness. The toughening agent preferably provides greater tear resistance, puncture resistance, wear resistance, tensile strength, toughness, durability, resiliency, penetration, impact strength or a combination thereof. In one embodiment, the additive improves the toughness of said region by at least 10%.

Figure 4:
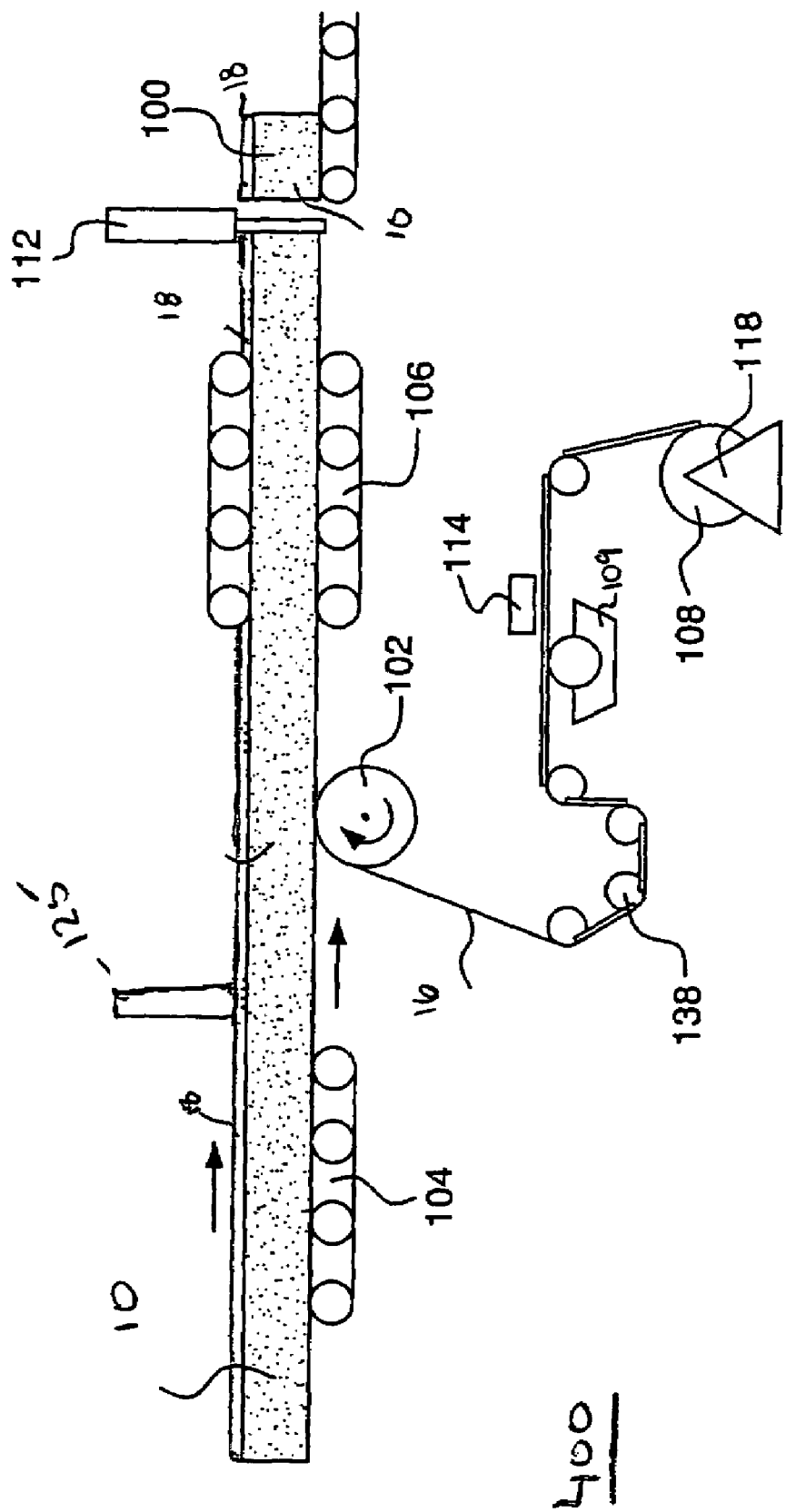
FIG. 4 is a side perspective view of a facing applicator stage used in forming the product of FIG. 1.

As noted above, in one embodiment, the sheet 10 optionally includes a second facing layer 18 coupled to the first major surface 11 of sheet 10. In an exemplary embodiment, facing layer 18 which may be a polymeric, foil (e.g., aluminum), paper, or FSK or PSK laminate layer like facing 16 of the sheet 10. Alternatively, facing layer 18 may include a non-woven facing layer that protects at least the first major surface 11 of the insulation blanket or mat 10 as taught by, for example, commonly assigned U.S. patent application Ser. No. 10/704,317, entitled "Insulation Product Having Nonwoven Facing and Process for Making Same," to Michael J. Lembo and Murray S. Toas or commonly assigned related application No. 10/753,741, entitled "Insulation Product Having Nonwoven Facing Layer," and Ser. No. 10/753,603, entitled "Method of Making Insulation Product Having Nonwoven Facing," to David I. Suda et al. filed Jan. 8, 2004. The nonwoven layer can also coat one or both side surfaces 13 and 14, and even part or all of the second major surface 12, to reduce the release of unbound fibers and dust. In further embodiments, the nonwoven layer 18 can be applied to the cut end surfaces, after the chopper 112 step (FIG. 4). In one embodiment, binder content may also be increased proximate to the surface 11 to impart additional surface toughness thereto.

A process for forming the insulation product 100 of FIG. 1 is described below in connection with FIGS. 2-5.

Figure 2:
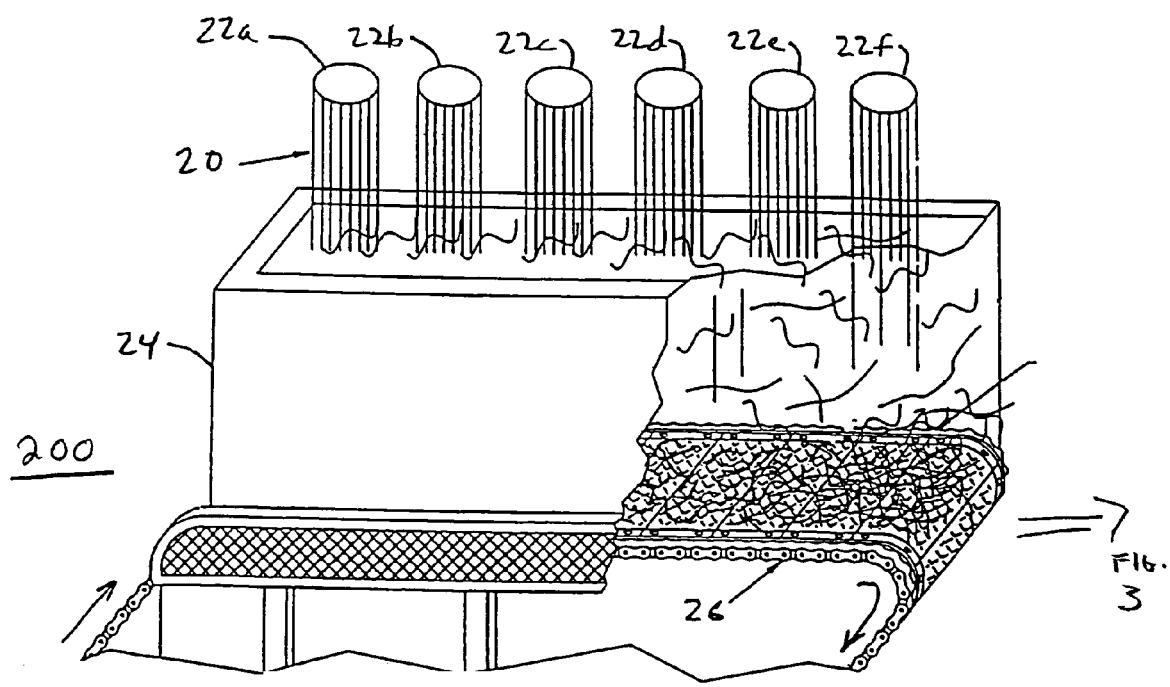
FIG. 2 is a partial side perspective view of a fiberizing stage used in forming the product of FIG. 1.

FIG. 2 shows a partial perspective view of a fiberizing stage 200 for forming an uncured fiber web. Stacked fiber layers are formed in stage 200 by melt spinning molten material, such as glass, into veils 20 of fine fibers using a plurality of fiberizing units 22a-22f. In an exemplary embodiment, three, four or even more fiberizing units 22 are utilized. The veils of fibers enter a forming hood 24 where a binder, such as a phenolic resin described above, in an aqueous carrier (or water and binder in sequence) is sprayed onto the veils 20. In the forming hood 24, fibers are accumulated and collected as a web on a chain, belt or other driven conveyor 26. The fibers accumulate on the conveyor 26, gradually increasing the thickness of the mat.

In one embodiment, the group of fibers that will later form the region proximate to second major surface 12 of sheet 10 are sprayed with extra binder relative to the rest of the fibers in the web to provide the enhanced surface toughness discussed above for product 100 once cured. For example, the fibers from the first and/or second fiberizers 22a, 22b may be sprayed with additional binder agent. As noted above, a toughening agent can also be added to the fibers that eventually form the region proximate to second major surface 12. Toughening agents may include a solvent based or latex additive, such PVA (polyvinyl acetate), PVOH (polyvinyl alcohol), PVC (polyvinyl chloride), SBR (styrene-butadiene rubber), acrylic, or thermoplastic additives, such as polyester, polyolefin or nylon fibers, which are melted at curing oven temperatures to form a melt bond with the randomly oriented fibers of the board to increase mechanical properties thereof. The toughening agent can be blended with the binder and sprayed along with the binder onto the fibers.

Figure 3:
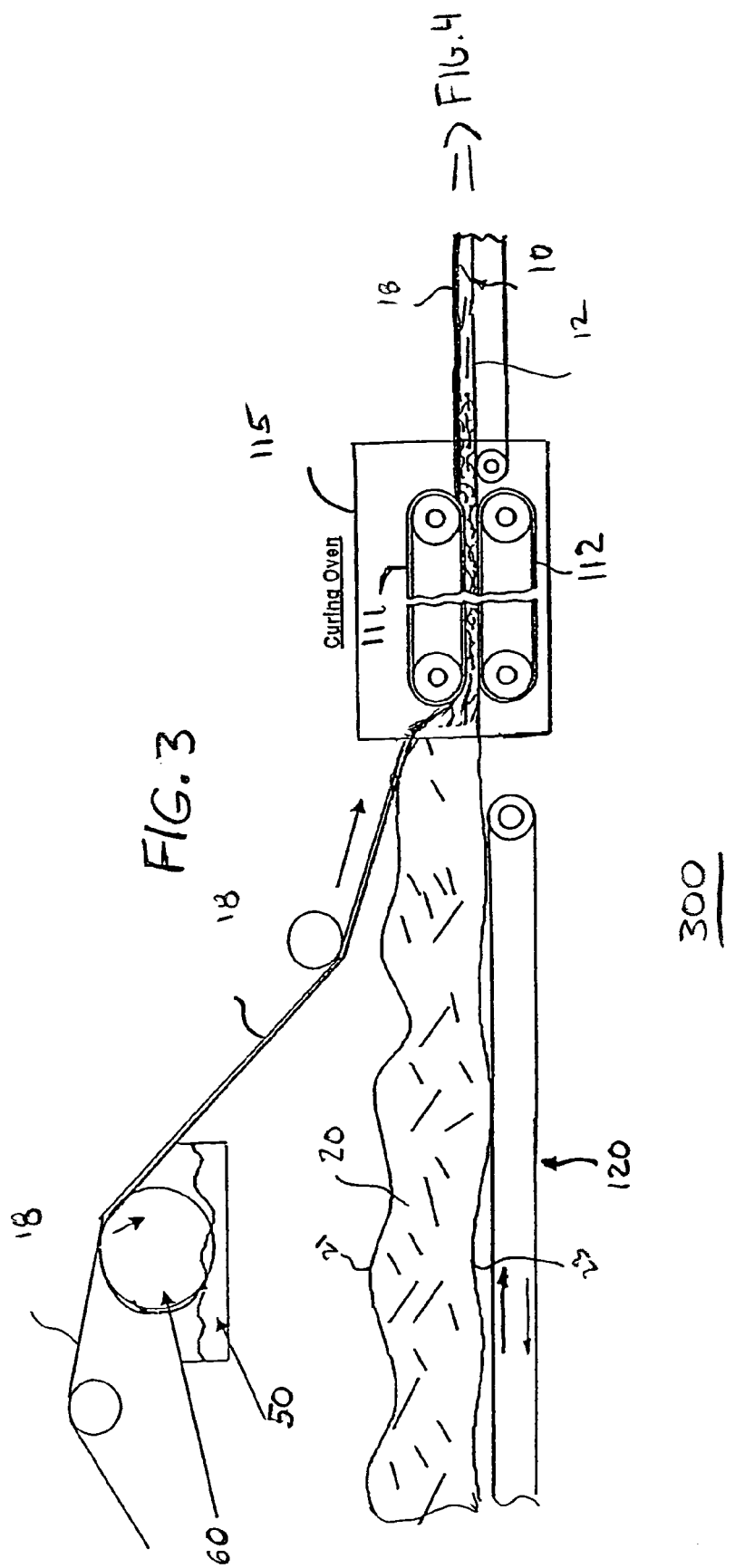
FIG. 3 is a side perspective view of a curing oven stage used in forming the product of FIG. 1.

After the web exits the fiberizing stage 200, it is conveyed to the curing stage 300 of FIG. 3. for compressing and curing the web to a desired thickness and density. While in the oven, the web is heated in order to cure the binder and adhere the portions to one another so as to form the homogeneous mass of sheet 10.

FIG. 3 shows an apparatus 300 for packing the loose fiber glass material 20 into a fiber board layer 10. Stage 300 is described in detail in commonly assigned U.S. application Ser. No. 10/141,595 to John O. Ruid, et al., entitled "Duct Board Having Two Facings", the entirety of which is hereby incorporated by reference herein. The fibers are loaded onto a conveyor 120 and delivered to the curing oven 115. Curing oven 115 typically heats the uncured web at a temperature between about 300-600° F., and preferably between about 400-560° F., and more preferably between about 450-525° F., for a period typically between about 199 to 20 seconds (30-300 feet per minute (fpm)), and preferably between about 150-24 seconds (40-250 fpm), and more preferably between about 120-30 seconds (50-200 fpm) for a 100 foot long oven while the uncured web is held and conveyed by a series of compression conveyors flights 111 and 112 within the curing oven. The fiber board layer 10 is formed by compressing the web of resin coated glass fibers 20 from an initial thickness of about 25 centimeters to an appropriate thickness (e.g., 0.5-2") and density (preferably at about 4-7 lb/ft$^3$ (64-112 kg/m$^3$) and curing the resin binder. Typically, the curing step includes blowing hot air through the web 20.

Web 20 is shown generally having a first major surface 21, a second major surface 23 proximate to conveyor 120 and a pair of side surfaces (one of which is not shown). In one embodiment, the region of the web proximate to second major surface 23 has a higher percentage by weight of the heat curable binder compared with a total percentage by weight of the binder in the web. This region also optionally includes toughening additives, such as a latex resin, described above.

Assuming that the fibers emerge from the rotary spinning apparatus of FIG. 2 at a relatively constant mass flow rate, the mass per unit area is controlled by the line speed of oven flights 111 and 112, and the density is a function of the line speed and the spacing between flights 111 and 112 (i.e., the board thickness). For a constant board thickness, the conveyor speed of flights 111 and 112 determines density. Therefore, less dense duct board materials are produced at a higher speed.

In one embodiment, second facing layer 18 is a non-woven layer applied to the top surface of the loose fiber glass 20 before the loose fiber glass 20 enters the oven 115. Adhesive 50 is applied to the layer 18 at a rate sufficient to penetrate the layer 18. The penetrated adhesive 50 "tacks" the layer 18 to the top oven flight 111. The bottom side of the fiber board layer 10 (bottom in FIG. 3) is made smooth, so that the exterior facing (e.g., FSK) 16 can be applied and readily adhered. The smooth surface of exterior side (i.e., second major surface 12) is formed by running top flight 111 and bottom flight 112 at different speeds. The exterior surface (the side to be made smooth) is "skidded" in the curing oven 115. That is, the surface 12 moves relative to the bottom flight 112. When the sheet 10 and layer 18 emerge from the curing oven 115, the top flight 111 peels away from the top of the layer 18. The sheet 10 with optional facing layer 18 is then provided to the facing applicator stage 400 of FIG. 4. In an alternative embodiment, layer 18 is applied after curing oven stage 300.

With respect to FIG. 4, a continuous glass fiber sheet 10 formed in accordance with the process of FIGS. 2-3 is presented by a feed conveyer 104 to a heated roll 102, to which is simultaneously supplied a continuous web of facing layer 16, fed between the heated roll 102 and the cured glass fiber sheet 10. The web of facing layer 16 is fed via roller 102 of FIG. 4 after being coated with an adhesive from adhesive applicator 109 to the second major surface 12 of board 10. Facing layer 16 is fed from a roll 108 on payout stand 118 and through an accumulator 138 for tensioning facing layer 16. In addition, the outside surface of the web can be marked at a marking station 114 with identifying information such as the R-value of the insulation board 10 and the production lot code before the layer 16 is applied to the bottom of the glass fiber board 10. The faced glass fiber sheet is transported away from the heated roll 102 by a tractor section 106, and delivered to a chopper 112, which periodically chops the sheet to form insulation products 100. The sheet may also be provided to a slicer 125 to slice the sheet into sections having desired widths. The insulation products 100 so formed are then transported to packaging equipment (not shown).

Figure 5:
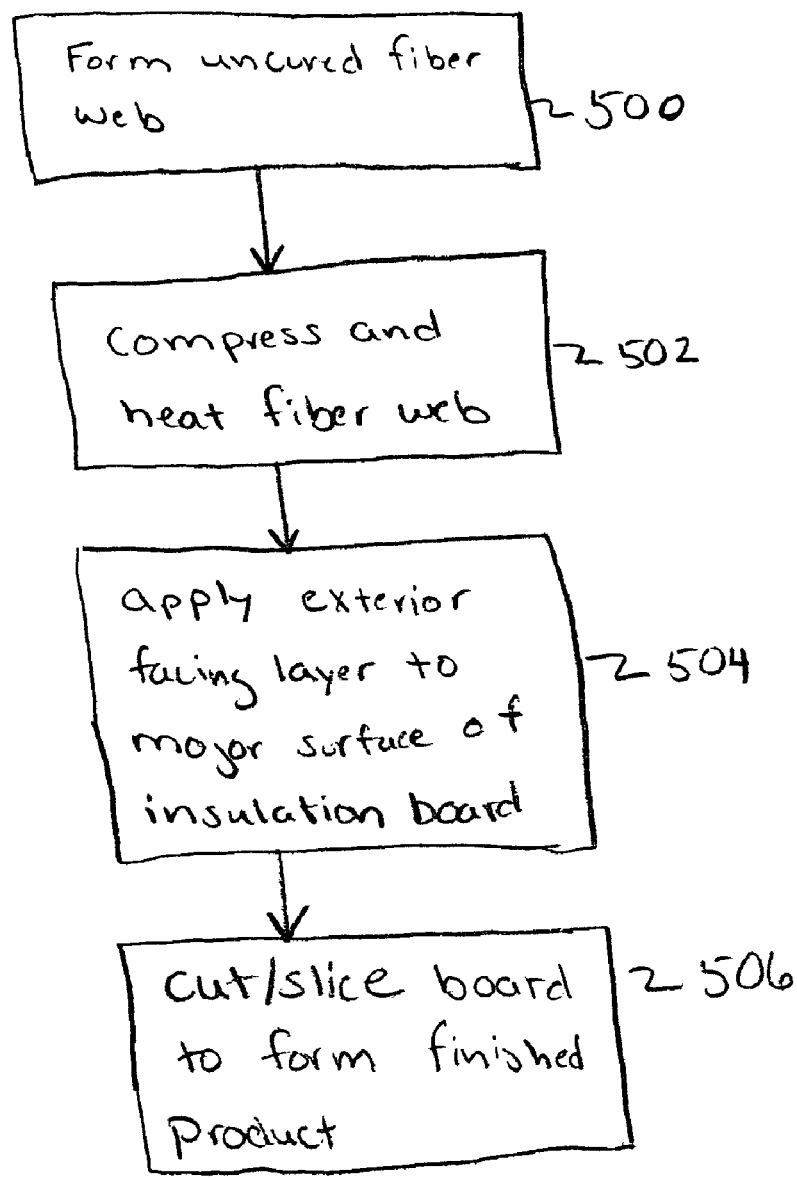
FIG. 5 illustrates the steps of an exemplary process of forming the insulation product of FIG. 1.

FIG. 5 is a flow chart diagram of an exemplary process for forming the insulation product 100. At step 500, an uncured fiber web 20 is formed on conveyor 26. Fibers in at least a region proximate to where a facing layer 16 is to be applied are provided with additional binder agent relative to the overall binder content of the web. At step 502, the uncured web 20 is provided to a curing oven 115 for compression and curing of the web to form rigid board sheet 10. Optionally, a top nonwoven facing layer 18 is applied and adhered to the board 10. A region of the sheet having the increased levels of binder agent, and optionally the toughening additives, is more resistant to tearing than the remainder of the sheet. At step 504, an exterior facing 16 (e.g., FSK) is adhered to the smooth second major surface 12 of the sheet 10. At step 506, sheet 10 is optionally sliced and cut to form final insulation product 100. The method provides an insulation product with improved surface rigidity and/or toughness proximate to a facing layer without adding significant additional expense and/or weight to the product.

Although various embodiments have been illustrated, this is for the purpose of describing and not limiting the invention. Various modifications, which will become apparent to one of skill in the art, are within the scope of this invention described in the attached claims.

What is claimed:

1. A method of manufacturing an insulation product comprising the steps of:
   forming a web of randomly oriented fibers on a forming belt, said fibers being coated with a heat curable binder, said web generally having a first major surface and a second major surface and a pair of side portions,
   wherein said web has a higher percentage by weight of said heat curable binder in a region of said web proximate to at least one of said major surfaces compared with a total percentage by weight of said binder in said web,
   compressing and heating said web to form a sheet of said randomly oriented fibers bonded by said heat curable binder, said sheet having first and second major surfaces and a pair of side portions; and affixing a facing layer to said at least one of said major surfaces of said sheet, wherein a region of said sheet proximate to said facing layer is more puncture resistant than a remainder of said sheet.

2. The method of claim 1, wherein said sheet is a rigid or semi-rigid insulation board.

3. The method of claim 2, wherein said board is a fiberglass board having a fiber density greater than about 2.0 pounds per cubic foot.

4. The method of claim 1, wherein said facing layer is selected from the group consisting of a polymeric, foil, paper, or FSK or PSK laminate layer.

5. The method of claim 1, wherein said sheet includes at least about 16 percentage by weight binder and said region of said sheet proximate to said facing layer is between about 25-33 percent of the thickness of said sheet.

6. The method of claim 5, wherein said sheet includes between about 16-25 percentage by weight binder.

7. The method of claim 5, further comprising the step of providing a toughness improvement additive to said web, wherein said region of said sheet proximate to said facing layer includes said toughness improvement additive.

8. The method of claim 7, wherein said additive includes a latex additive.

9. The method of claim 7, wherein said additive improves the toughness of said region by at least 10%.

10. The method of claim 7, wherein said additive improves the tensile strength of said region.

11. The method of claim 7, wherein said additive comprises thermoplastic fibers that are meltbonded to said randomly oriented fibers at least in said region.

12. The method of claim 1, further comprising the step of providing a toughness improvement additive to said web, wherein said region of said sheet proximate to said facing layer includes said toughness improvement additive.

13. A method of manufacturing an insulation board product comprising the steps of:

forming a web of randomly oriented glass fibers on a forming belt, said fibers being coated with a heat curable binder, said web generally having a first major surface and a second major surface and a pair of side portions, wherein said web has a higher percentage by weight of said heat curable binder in a region of said web proximate the first major surface compared with a total percentage by weight of said binder in said web, compressing and heating said web to form a rigid or semi-rigid fiber glass board, said board having first and second major surfaces corresponding to the first and second major surfaces of the web and a pair of side portions; and affixing a facing layer to the first major surface, wherein a region of said board proximate to the facing layer is more puncture resistant than a remainder of said board.

14. The method of claim 13, wherein said board has a fiber density greater than about 2.0 pounds per cubic foot.

15. The method of claim 14, further comprising the step of providing a toughness improvement additive to said web, wherein said region of said board proximate to said facing layer includes said toughness improvement additive.

16. The method of claim 14, wherein said board includes at least about 16 percentage by weight binder and said region of said board proximate to said facing layer is between about 25-33 percent of the thickness of said board.

17. The method of claim 13, further comprising the step of providing a toughness improvement additive to said web, wherein said region of said board proximate to said facing layer includes said toughness improvement additive.

18. The method of claim 17, wherein said additive includes latex.

19. The method of claim 17, wherein said additive improves the toughness of said region by at least 10%.

20. The method of claim 17, wherein said additive improves the tensile strength of said region.

21. The method of claim 17, wherein said additive comprises thermoplastic fibers that are meltbonded to said randomly oriented glass fibers at least in said region.

22. A method of manufacturing an insulation board product comprising the steps of:

forming a web of randomly oriented glass fibers on a forming belt, said fibers being coated with a heat curable binder, said web generally having a first major surface and a second major surface and a pair of side portions, wherein said web has a higher percentage by weight of said heat curable binder in a region of said web proximate the first major surface compared with a total percentage by weight of said binder in said web, compressing and heating said web to form a rigid or semi-rigid fiber glass board, said board having first and second major surfaces corresponding to the first and second major surfaces of the web and a pair of side portions; and affixing a facing layer to the first major surface, wherein a region of said board proximate to the facing layer is more durable than a remainder of said board.

* * * * *